US009836567B2

United States Patent
Berkovitz et al.

(10) Patent No.: US 9,836,567 B2
(45) Date of Patent: Dec. 5, 2017

(54) METHOD OF SIMULATING A SEMICONDUCTOR INTEGRATED CIRCUIT, COMPUTER PROGRAM PRODUCT, AND DEVICE FOR SIMULATING A SEMICONDUCTOR INTEGRATED CIRCUIT

(75) Inventors: Asher Berkovitz, Kiryat Ono (IL); Uzi Magini, Hadera (IL); Michael Priel, Netanya (IL)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/424,212

(22) PCT Filed: Sep. 14, 2012

(86) PCT No.: PCT/IB2012/054807
§ 371 (c)(1),
(2), (4) Date: Feb. 26, 2015

(87) PCT Pub. No.: WO2014/041403
PCT Pub. Date: Mar. 20, 2014

(65) Prior Publication Data
US 2015/0242544 A1    Aug. 27, 2015

(51) Int. Cl.
*G06F 17/50*    (2006.01)

(52) U.S. Cl.
CPC ........ *G06F 17/505* (2013.01); *G06F 17/5022* (2013.01); *G06F 17/5081* (2013.01); *G06F 2217/08* (2013.01); *Y02T 10/82* (2013.01)

(58) Field of Classification Search
CPC . G06F 17/505; G06F 17/5022; G06F 17/5081
USPC .................. 716/105, 103, 106, 111; 703/16
See application file for complete search history.

(56) References Cited

U.S. PATENT DOCUMENTS

| 6,598,209 B1 | 7/2003 | Sokolov |
| 6,865,722 B2 | 3/2005 | Chen et al. |
| 6,901,565 B2 | 5/2005 | Sokolov |
| 8,745,567 B1* | 6/2014 | Varadrajan ............ G06F 17/504 716/101 |
| 2002/0157080 A1* | 10/2002 | Kato ................... G06F 17/5045 716/104 |

(Continued)

FOREIGN PATENT DOCUMENTS

JP    09251061 A  *  9/1997

OTHER PUBLICATIONS

International Search Report and Written Opinion correlating to PCT/IB2012/054807 dated Mar. 8, 2013.

*Primary Examiner* — Phallaka Kik

(57) ABSTRACT

A method and device for simulating a semiconductor IC is provided, which comprises generating a high level description of the IC, generating a low level description of the IC comprising a plurality of instances describing the operation of the IC, conducting a low level function analysis of the IC based on metrics values associated with the instances, and performing a design optimization scheme. The scheme comprises mapping the metric values of instances describing functional units different from standard cells, to standard cells logically connected to said instances, by dividing each of the instance metrics values between a group of standard cells logically connected to the corresponding instance and adding each resulting portion of said instance metric value to the metric value of each of the group of standard cells, respectively.

19 Claims, 7 Drawing Sheets

(56) References Cited

U.S. PATENT DOCUMENTS

| | | | |
|---|---|---|---|
| 2002/0162097 A1* | 10/2002 | Meribout | G06F 17/5045 717/155 |
| 2003/0069724 A1 | 4/2003 | Schubert et al. | |
| 2004/0003363 A1* | 1/2004 | Odilavadze | G06F 17/5068 716/55 |
| 2004/0268181 A1* | 12/2004 | Wang | G01R 31/318586 714/30 |
| 2007/0150846 A1* | 6/2007 | Furnish | G06F 17/5068 716/122 |
| 2008/0010618 A1 | 1/2008 | Watanabe | |
| 2008/0141210 A1 | 6/2008 | Fredrickson et al. | |
| 2008/0216038 A1* | 9/2008 | Bose | G06F 17/5072 716/118 |
| 2009/0031277 A1 | 1/2009 | McElvain et al. | |
| 2014/0103959 A1* | 4/2014 | Andreev | H03K 19/018585 326/41 |

* cited by examiner

METHOD OF SIMULATING A SEMICONDUCTOR INTEGRATED CIRCUIT, COMPUTER PROGRAM PRODUCT, AND DEVICE FOR SIMULATING A SEMICONDUCTOR INTEGRATED CIRCUIT

FIELD OF THE INVENTION

This invention relates to a method of simulating a semiconductor integrated circuit, a computer program product, and a device for simulating a semiconductor integrated circuit.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments of the invention need not solve all (or even any) of the problems brought forward in this section.

Simulation is a key activity performed in the process of taking a hardware design from concept to realization as a semiconductor integrated circuit. Simulation covers many technological aspects that trigger the resulting performances of the design. Simulation has much value for hardware designers as it is used for proving correctness of a design before costly fabrication is launched.

To that end, simulation includes not only verifying the logical correctness of the hardware design, its throughput and latency, for instance, but also its power consumption. Indeed, power consumption has become one of the most critical performance parameters in modern Very Large Scale Integration (VLSI) Integrated Circuits (ICs), due to the continuously increasing power density of modern ICs, defined as the number of transistors per chip. Also, power efficiency has increased in importance in the context of the development of wireless and mobile technologies, which require low power integrated designs for a wide range of battery powered applications.

A hardware design can be simulated at a variety of levels of abstraction. Commonly, a model is simulated at several levels of abstraction in the same simulation run. Known levels of abstraction include Gate Level (GL) and Register Transfer Level (RTL). However, it is possible to incorporate lower levels like transistor level or even lower physical levels, as well as higher levels such as transaction levels or domain-specific levels.

Accurate power estimation can be done on a GL netlist. This estimation provides power data for every instance in the GL netlist. Most of these instances are created by the synthesis tools and do not exist in the RTL netlist.

Significant power optimization, however, can be done in the RTL netlist only, and therefore performing power optimization at GL level does not prove efficient. One option may be to do it by "reverse engineering" of GL power data or just in empiric way, meaning that each RTL change is just simulated for power change.

In addition, most of the synthesis flows "flatten" the RTL netlist, i.e. remove all the RTL hierarchy data from the design. As a result, identifying the power consumption of RTL module based on the GL netlist is not really possible.

One may consider synthesizing the design with strict restrictions on hierarchies, and mapping the power across GL-RTL common hierarchies. This methodology, however, would miss the most of the clock tree which is consumed at the top level, the intra hierarchy connections and the optimization done by the synthesis tool while running on a flat design.

U.S. Pat. No. 6,901,565 and U.S. Pat. No. 6,598,209, assigned to Sequence Design, Inc., disclose a RTL power analysis using GL cell power analysis. It is described therein a method of mapping macro power from GL netlist to RTL netlist. This method, however, requires synthesizing using specific macros and special condition.

U.S. Pat. No. 6,865,722, titled "Method of automating chip power consumption estimation calculation", describes how to map general power reports to a high level design. The disclosed solution enables mapping power consumption of high level hierarchies only, and does not provide the required granularity of RTL optimization, since data is available only for top level hierarchies and not for flip flop or even RTL sub modules.

US 2008/0010618 A1 discloses a method and a device for designing a semiconductor integrated circuit that reduces off leakage current. Wires connected to input terminals of a standard cell are exchanged with one another and a gate net list is changed so as to reduce off leakage current in accordance with a net probability and a power consumption table. The net probability is the probability of the state an input of the standard cell can take and is generated through an RTL function simulation and a gate level function simulation. This document suggests mapping RTL data to GL netlist.

SUMMARY OF THE INVENTION

The present invention provides a method of simulating a semiconductor integrated circuit, a computer program product, and a device for simulating a semiconductor integrated circuit as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Due in particular to the recent increase of mobile devices, a semiconductor integrated circuit is required to have a large scale while consuming as low power as possible. However, due to the scale enlargement of the semiconductor integrated circuit, a plurality of functional blocks is located on the semiconductor integrated circuit, and the power consumption of each functional block has increased.

The present invention finds application, for instance, in Electronic Design Automation (EDA) tools, which are a category of software tools for designing electronic systems such as semiconductor integrated circuits. Major EDA vendors include Cadence, Synopsys, Mentor Graphics, etc. Non limiting examples of EDA tools which include a high level/low level analysis feature, e.g. a RTL/GL analysis are: EPS/Encounter Test (Cadence), Apaches Power Theater (Synopsis), Tessnet (Mentor Graphics), etc.

Further, every semiconductor makers can use the proposed technique to analyze their ICs according to a high level/low level analysis such as a RTL/GL analysis as described herein.

An embodiment of the present invention will now be described with reference to the drawings.

Figure 1:
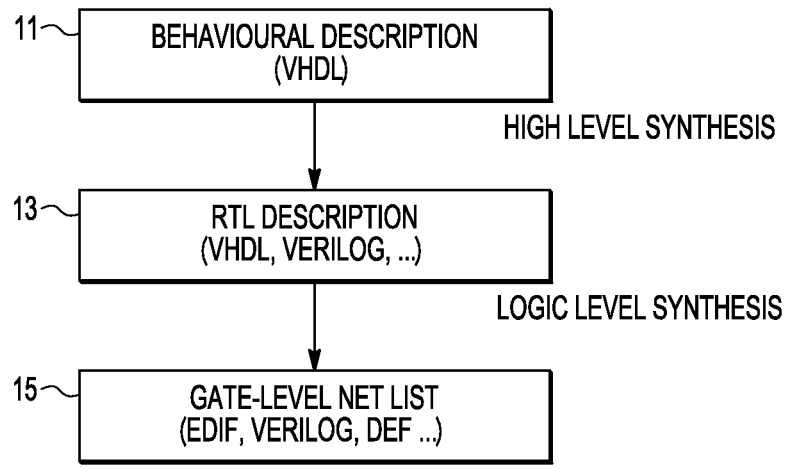
FIG. 1 schematically represents the automated synthesis flow addressed by the present invention.

FIG. 1 gives a schematic representation of the automated design cycle addressed by the present invention.

With reference to FIG. 1, a high level synthesis allows synthesizing a high level description 13 of the semiconductor integrated circuit from a behavioural description 11 of the circuit. In such high level representation 13, the semiconductor integrated circuit may be partitioned into sub-modules each including at least one register.

The behavioural description and the high level of representation of the semiconductor integrated circuit include respective definitions of the physical implementation of the circuit. They may be implemented as soft or code representations of physical circuitry or of logical representations convertible into physical circuitry, such as in a Very-High-Speed Integrated Circuits (VHSIC) Hardware Description Language (VHDL) or any other appropriate type of hardware description language (HDL). For instance, the high level representation of the circuit may be in the Verilog language which has been adopted as an open standard (IEEE 1364) and is commonly used in the industry.

For instance, the high level description of the integrated circuit may comprise a Register Transfer Level (RTL) description, in which the semiconductor integrated circuit is partitioned into sub-modules each including RTL registers.

Such high level description may have at least one hierarchy, and possibly one or several sub-hierarchies.

As shown further in FIG. 1, a Logic level synthesis such as, e.g. SYNOPSYS, allows synthesizing, from the high level description 13 of the semiconductor integrated circuit, a low level description 15 of the integrated circuit. Such low level description may comprise a plurality of instances describing the operation of the integrated circuit. These instances respectfully describe logically interconnected functional units.

For instance, the low level description of the integrated circuit may comprise a Gate Level (GL) net list 15 having GL instances describing the operation of the semiconductor integrated circuit. For example, GL net list 15 may be defined under the Electronic Design Interchange Format (EDIF) which has been adopted as the standard ANSI/EIA-548-1988. It shall be noted that any other format suitable for the specific implementation may be preferred to EDIF. For instance the low level representation of the circuit may be in the Verilog language, or in the DEF format (i.e., described in a module-definition (.def) file).

Figure 2:
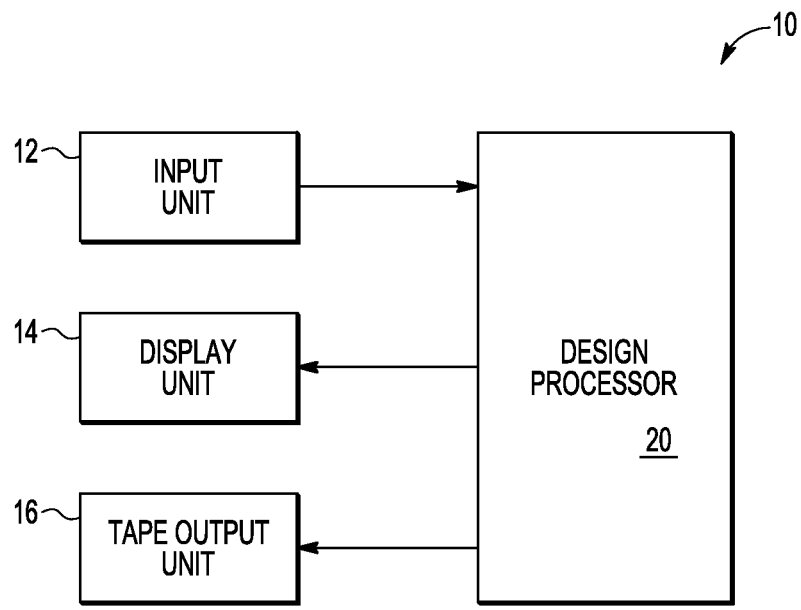
FIG. 2 shows a flow chart of an example of the method of simulating a semiconductor integrated circuit with the semiconductor simulating device.

FIG. 2 is a schematic block diagram showing the simplified structure of a device 10, which functions as a device for designing a semiconductor integrated circuit.

As shown in FIG. 2, the semiconductor designing device 10 includes a design processor 20, which is connected to an input unit 12, a display unit 14, and a tape output unit 16.

An operator operates the input unit 12 to generate an input, e.g. to input commands and/or behavioural description data for the semiconductor IC, and/or to upload a test pattern from an external data storage.

The display unit 14 is adapted to display operations of the design processor 20 on, e.g. a screen. Such operations may include, for instance, menus for allowing the operator to select the input commands and/or to input data values for defining the behavioural description of the semiconductor IC, as well as simulation results or a graphical representation (e.g. drawing) of the layout of the completed circuit design. It shall be noted that the present description is not intended to be limited to the above examples.

Further, layout data defining the completed circuit design may be output from the design processor 20 to the tape output unit 16 in any appropriate form and/or language. It shall be noted that any other type of output storage unit, for instance a CD-Rom, a hard-disc drive, a USB drive, etc., may be substituted to the tape output unit 16.

Figure 3:
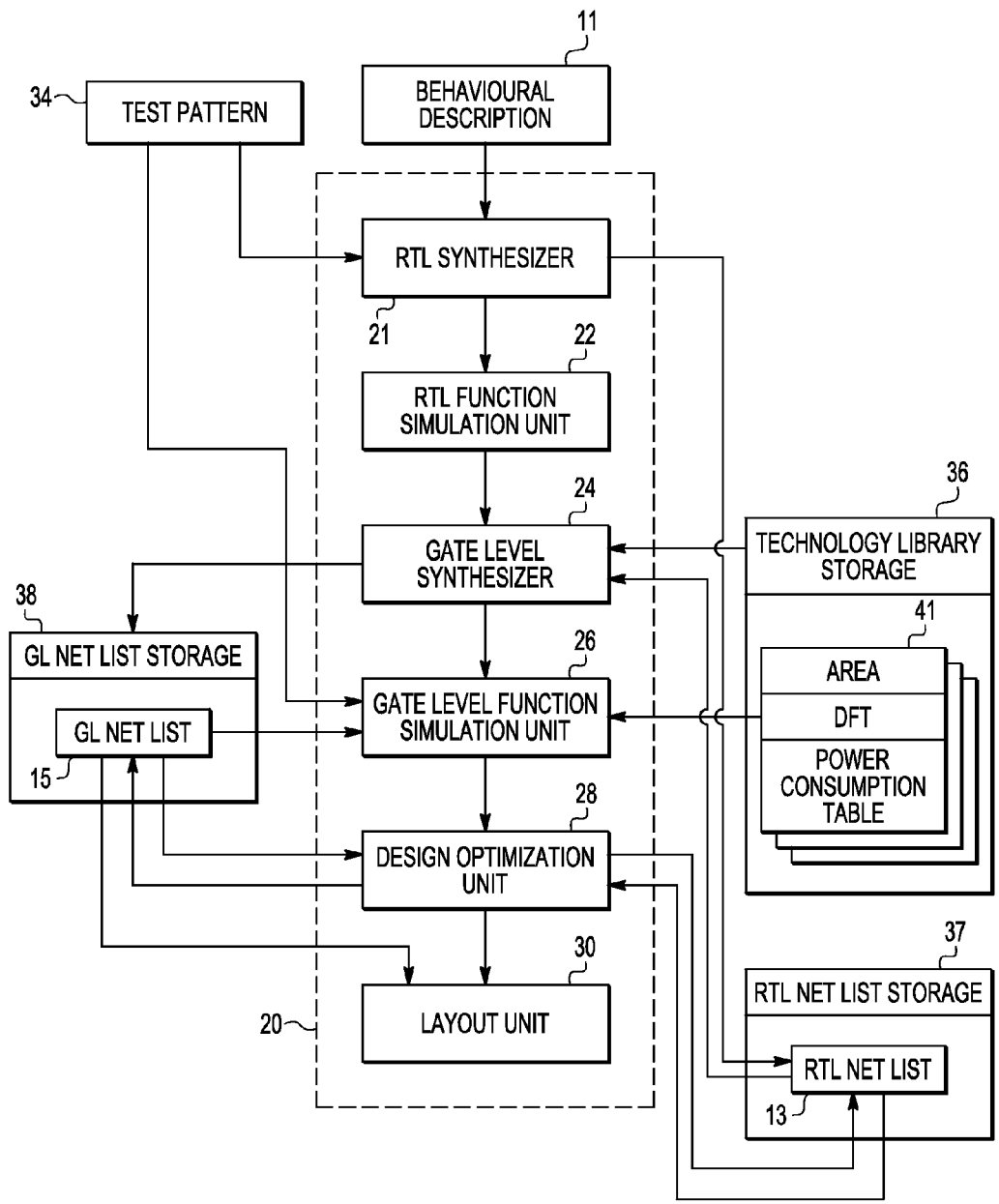
FIG. 3 schematically shows an example of the structure of an embodiment of a semiconductor designing device according to the invention.

FIG. 3 is a block diagram of an example embodiment of the design processor 20 of FIG. 2.

As shown in FIG. 3, the design processor 20 according to the proposed embodiment includes a high level synthesizer 21 generating a high level description of the semiconductor IC, for instance an RTL synthesizer 21 capable of generating the RTL net list 13 of FIG. 1. The RTL net list 13 may be stored in a RTL net list storage unit 37.

Processor 20 further includes a high level simulation unit 22, namely an RTL simulation unit in the shown example.

Still further, the processor 20 additionally comprises a low level description synthesizer 24, which generates a low level description of the semiconductor IC, for instance a logic synthesizer 24 which generates the GL net list 15 of FIG. 1. The GL net list 15 may be stored in a RTL net list storage unit 38.

The processor 20 also comprises a technology library storage unit 36. Said storage unit 36 functions as a storing means for storing information related to functional units which form elementary components of a semiconductor integrated circuit. These elementary components are logical circuits, each having a certain function. For instance, such elementary components include inverters, NAND gates, NOR gates, adders, multiplexers, flip-flops, etc. Information related to the functional units stored in the unit 36 may include, in addition to input/output terminal information, some metric values associated with any instance of the GL net list. These metrics may relate to, e.g., the semiconductor area, a Design for Testability (DFT) and the consumed current or power, for some or all of the functional units which may be used to describe the semiconductor IC in the GL representation. In particular, power metrics may be stored in the power consumption table 41 of the storage unit 36 as shown in FIG. 3. For each of the functional units of the GL net list, the associated power metric may be, for instance, in accordance with the average power consumption values for the functional unit as a function of technology and/or simulation. It will be apparent that any number and any types of metrics may be present in the storage unit 36, being associated to some or all of the elementary components.

Among the functional units, there may be standard cells such as, for instance, flip-flops (FFs), and other functional units different from said standard cells. Flip-flops are of particular relevance a standard cells for the implementation of the present invention since an instance power consumption can be divided between several FFs in the GL representation.

Finally, the processor 20 includes a gate level function simulation unit 26, a design optimization unit 28, and a layout unit 30, the operation of which will now be described in detail below.

When behavioural description 11 is input to the RTL synthesizer 21 and a test pattern 34 is input to the RTL function simulation unit 22, the RTL function simulation unit 22 conducts a simulation to check whether or not the RTL net list 13 functions as designed. Then, the RTL function simulation unit 22 outputs the simulation result as "OK" or "NG" to the logic synthesizer 24. As previously noted, the RTL net list 13 is defined in a hardware description language (HDL) and is adapted to describe a circuit specification. Further, the test pattern 34 is an input pattern for conducting function testing.

When the result of the RTL function simulation unit 22 is "OK," the logic synthesizer 24 performs logic synthesis with the RTL net list 13 and data from the technology library storage unit 36. This logic synthesis generates the GL net list 15 of FIG. 1 for the hardware design. The logic synthesizer 24 then stores the obtained GL net list 15 in the gate level net list storage unit 38.

The design optimization unit 28 is arranged to identify opportunities of improving the performance of the semiconductor IC, for instance in terms of consumed power, by modifying the design. Detailing an example of a design optimization scheme which may be used would go beyond the object of the present description. Yet it shall be noted that such scheme may be based on the metric values which may be compared with corresponding values stored in a database. The scheme may comprise modifying the design, by arranging same elementary components in a different layout and/or by selecting a different set of elementary components arranged so as to perform the same function.

Finally, the layout unit 30 is arranged to generate the layout of the design under test from the RTL and GL representations of the design. Once the optimization process is complete, the layout of the final version of the design may be saved as a data file in any appropriate format, and is output to the tape output unit 16 of FIG. 1.

Figure 4:
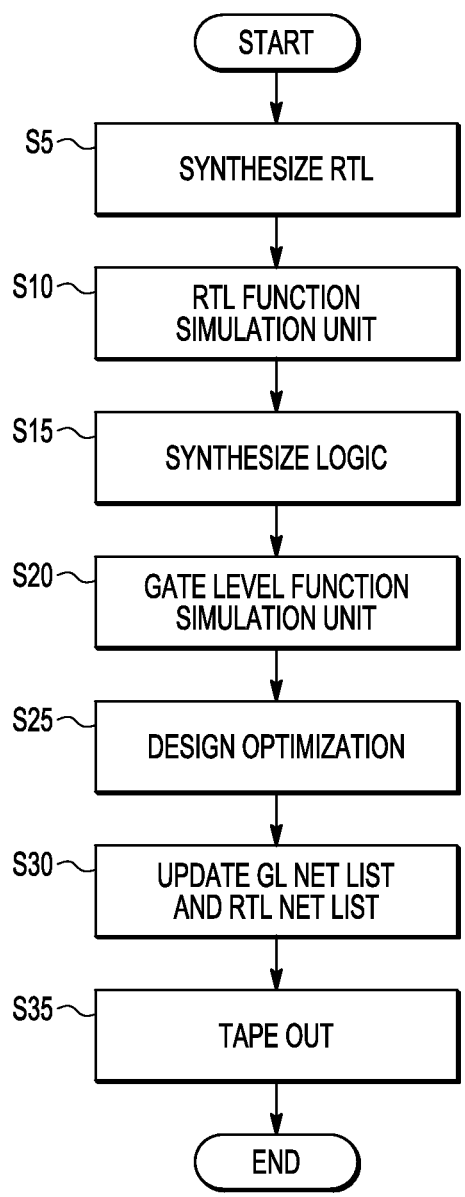
FIG. 4 shows a block diagram of an example embodiment of the design processor of the semiconductor designing device of FIG. 1.

The process for designing a semiconductor integrated circuit with the semiconductor designing device 10 will now be discussed with reference to FIG. 4.

First, at S5, the high level description 13 of the semiconductor integrated circuit is generated from the behavioural description 11 of the circuit. In this high level description, for instance, a RTL net list, the semiconductor integrated circuit is partitioned into sub-modules each including at least one register, e.g. a RTL register in the shown example. The obtained RTL net list 13 is stored in the RTL net list storage 37.

At S10, the RTL function simulation unit 22 conducts an RTL function simulation. More specifically, when receiving the RTL net list 13 and the test pattern 34, the RTL function simulation unit 22 uses the test pattern 34 to conduct a simulation for checking whether or not the expected function can be obtained with the description of the RTL net list 13.

If the RTL function simulation unit 22 determines that the description of the RTL net list 13 allows obtaining the expected function, the logic synthesizer 24 uses the RTL net list 13 and the technology library storage 36 to perform logic synthesis of the circuit.

More precisely, at S15, a low level description of the integrated circuit is generated by the synthesizer 24 from the high level description of the semiconductor IC, namely from the RTL net list 13 stored in the RTL net list storage 38. The obtained low level description of the semiconductor IC, for instance a GL net list, comprises a plurality of instances describing the operation of the integrated circuit. These instances respectfully describe logically interconnected functional units. The functional units include standard cells and other functional units different from said standard cells. More specifically, the logic synthesizer 24 reads the standard cells described in the RTL net list 13 from a technology file stored in the technology library storage 36 to generate the GL net list 37. Then, the logic synthesizer 24 stores the generated GL net list 15 in the GL net list storage 38. The GL net list 13 may have any format adapted to the application, for instance EDIF, DEF, etc.

Next, at S20, the gate level function simulation unit 26 conducts a gate level function simulation, which includes retrieving, from the technology library storage 36, metrics values respectively associated with each instance of the low level description of the semiconductor integrated circuit, i.e., of the GL net list 15. More specifically, the gate level function simulation unit 26 receives the test pattern 34, the metrics values from the technology library storage 36 (including, for instance, power metrics from the power consumption table 41), and the GL net list 15 from the GL net list storage 38. Then, the gate level function simulation unit 26 conducts a simulation and outputs simulation results including, for instance, power consumption results.

Subsequently, the design optimization unit 28 conducts a design optimization scheme, at S25. More specifically, the design optimization unit 28 inputs the GL net list 15 and computes the simulation results, and derives there from modifications of the design so that the overall power consumption becomes minimum or, at least, is reduced. Such modifications may include, for instance, changing the number, the nature and/or the arrangement of the functional units constituting the design at the gate level. The design optimization scheme may be carried out by an automated engine running on a processor, e.g. a Digital Signal Processor (DSP), for instance in combination with a database of design rules. Alternately or in addition, the optimization scheme may be realized at least in part by the operator himself, based on his own knowledge and skills as a circuit designer.

Once an optimized design is defined as a result of the above optimization scheme, at S30, the resulting GL net list 15 is stored as the new GL net list 15 in the GL net list storage unit 38. In other words, the GL net list 15 is updated in the GL net list storage 38. Similarly, the RTL net list 13 is updated in the GL net list storage unit 37.

At S35, the layout unit 30 generates the layout of the optimized design, which is output to the tape out unit 16 of FIG. 2.

Figure 5:
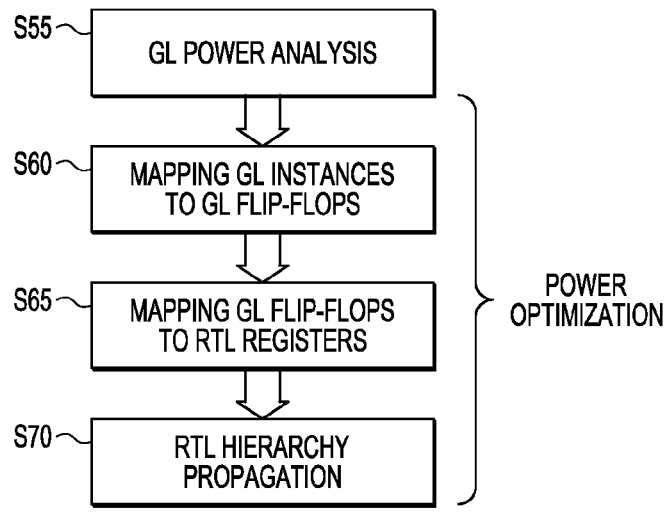
FIG. 5 shows a flow chart illustrating an example of a design optimization scheme.

Details of the design optimization scheme carried out by the design optimization unit 28 will now be described with reference to the flow chart of FIG. 5, while taking the example of a power optimization scheme. In this example, the metrics include power consumption values respectively associated with each instance of the low level description, i.e. GL net list of the semiconductor integrated circuit.

It shall be appreciated, nevertheless, that the same process can be applied for the implementation of any other type of design optimization, for instance for the optimization of the semiconductor area consumed by the design or the optimization of the Design for Testability (DFT), provided that corresponding metrics are available in the technology library storage 36.

At S55, a low level (i.e., GL) power analysis is performed by the Gate level function simulation unit 26. This analysis includes it is retrieving, from the technology library storage 36, metrics values respectively associated with each instance of the GL description of the semiconductor IC under test, and conducting the GL function analysis of the semiconductor IC based on said metrics values.

Afterwards, there is performed a design optimization. More precisely, in the shown example, a power optimization scheme is conducted by the design optimization unit 28. Conducting this scheme may comprise:
  at S60, mapping the metrics values of instances describing, in the low level description of the semiconductor integrated circuit, functional units different from the standard cells, to standard cells logically connected to said instances. This may be obtained by dividing each of the instance metrics values between standard cells logically connected to the corresponding instance and adding each resulting portion of said instance metric value to the metric value of each of said standard cells logically connected to said corresponding instance;
  at S65, mapping metrics values respectively associated with each standard cell of the low level description of the semiconductor integrated circuit to a corresponding register of the high level description of the integrated circuit, based on the mapping performed at S60; and,
  at S70, determining metrics values respectively associated with the sub-modules based on the mapping of S65, so that the mapped power metrics values propagate throughout the RTL hierarchies, if any.

The proposed flow for mapping GL net list based power estimation to RTL net list makes power optimization task much more efficient, because it helps the designer identifying opportunities for power optimization in digital designs at the register transfer level of description of the IC.

Contrary to the method disclosed in U.S. Pat. No. 6,901, 565 and U.S. Pat. No. 6,598,209 identified in the introduction of the present description, the innovation described herein allows using every type of GL net list and synthesis flows.

The first mapping of S60 may be done by dividing the metrics value of any instance equally between all the standard cells logically connected to the instance. This is the simplest implementation In one implementation, the first mapping of S60 may comprise dividing the instance metrics values of each of the instances between standard cells logically connected to the corresponding instance substantially equally between at least one drive standard cell and at least one load standard cell to which said corresponding instance is logically connected.

It shall be understood that the sharing of the metrics values between the above defined standard cells may be implemented with any ratio suitable for the specific implementation. For example, more weight can be given to the instances logically connected to the instance's inputs than to the instance's output, or vice versa, depending on e.g., technology factors.

The standard cells may be flip-flops (FFs). Indeed, as already set out above, an instance power consumption can be divided between several flip-flops FFs in the GL representation.

In some implementations, the high level description of the semiconductor IC may be such that the IC is partitioned into sub-modules at least some of which including a plurality of registers logically associated according to a hierarchy. In that case, it may be provided that, for every sub-module of the low level description of the integrated circuit, the determination of the metrics value of the sub-module comprises setting said metric value as the sum of respective metrics values of all registers of the sub-module in the hierarchy. This allows accounting for the existing logical hierarchies in the design.

Similarly, there are cases where a hierarchy has at least one sub-hierarchy. For such cases, it may be provided that, for every sub-module of the low level description of the semiconductor integrated circuit, the determination of the metrics value of the sub-module comprises setting said metrics value as the sum of respective metrics values of all registers of the sub-module in the hierarchy and in every sub-hierarchy of said hierarchy.

An example of implementation of the method will now be described with reference to FIG. 6-FIG. 11.

Figure 6:
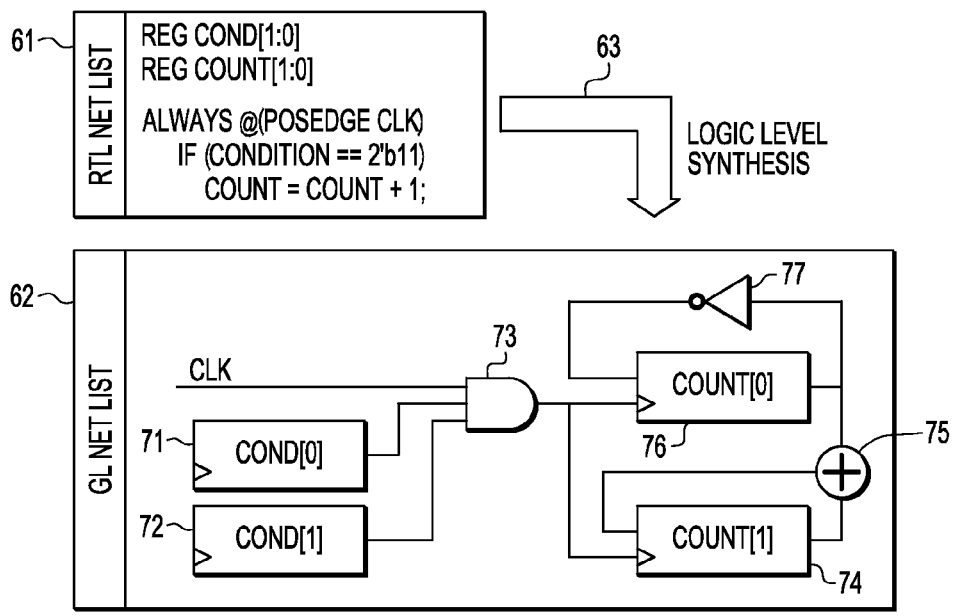
FIG. 6 to FIG. 11 schematically show an example of application of the method to an example of integrated circuit design.

As shown in FIG. 6, let us consider a very simple design whose RTL net list 61 is partially represented in the small rectangle at top of the drawing, and whose GL net list 62 is schematically represented by the bigger rectangle at bottom of the drawing. The GL net list 62 has been obtained from the RTL net list 61 through logic level synthesis, as shown by the arrow 63. The RTL net list 61 comprises two registers, namely "cond[1:0]" and "count[1:0]". The GL net list 62 has the following functional units, namely GL instances: a first flip-flop 71 (named "cond[0]" in the shown example), a second flip-flop 72 (named "cond[1]" in the shown example), a NAND gate 73, a third flip-flop 74 (named "cont[1]" in the show example), an adder 75, a fourth flip-flop 76 (named "cont[0]" in the show example), and an inverted 77. The flip-flops 71, 72, 74 and 76 correspond to the standard cells as described above, and the other instances 73, 75 and 77 correspond to the other cells.

Figure 7:
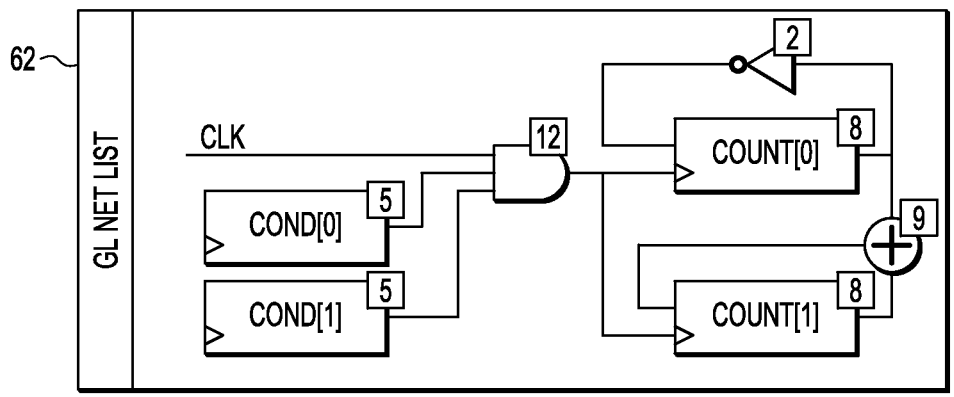

FIG. 7 shows the outcome of the GL power analysis of the design which is conducted based on the low level description of the design and, further, on metrics values retrieved from the technology library storage 36 and respectively associated with each instance in the GL description of the design. In the shown example, the resulting metrics values for each instance of the GL net list 62 is indicated in a small square closed to the symbol of the instance in the drawing. For instance, the indicated values may be expressed in milliwatts.

Figure 8A:
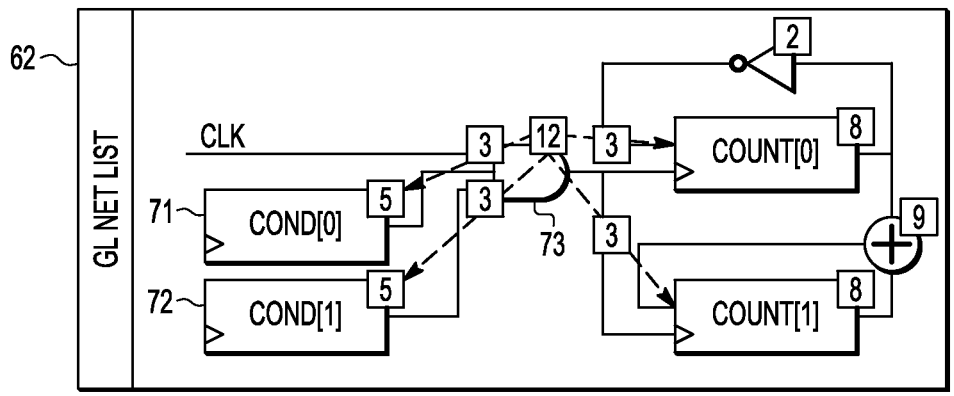
Figure 8B:
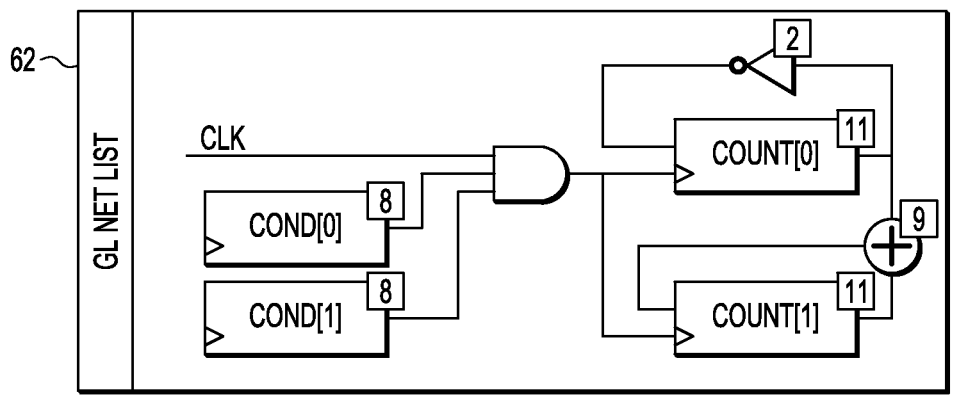

As shown in FIG. 8A and FIG. 8B, the metrics values of the NAND gate 73, which is a functional unit different from the standard cells, i.e. different from a flip-flop, is mapped to the standard cells logically connected thereto, i.e. to flip-flops 71, 72, 74 and 76. In the shown example, this mapping includes dividing the metrics value equally between these four flip-flops, which include drive flip-flops 71 and 72, and load flip-flops 74 and 76. More precisely, as shown in FIG. 8A, the metrics value of 12 milliwatts of the NAND gate 73 is divided in four portions of 3 milliwatts each, which are added to the metrics values of flip-flops 71, 72, 74 and 76, respectively, whereby to obtain the configuration illustrated in FIG. 8B.

Figure 9A:
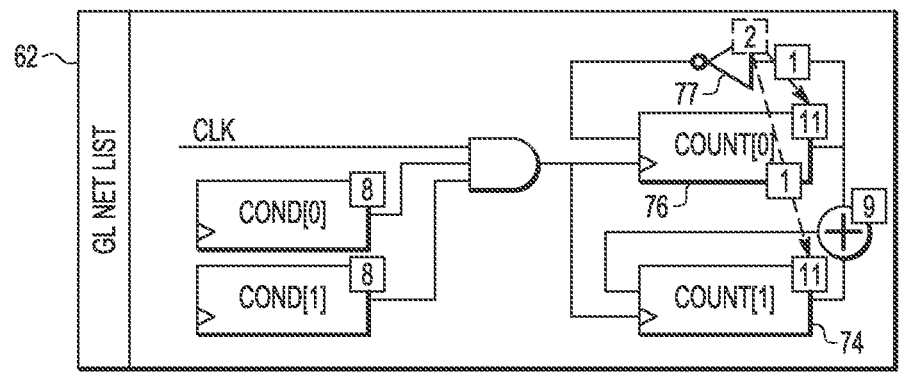
Figure 9B:
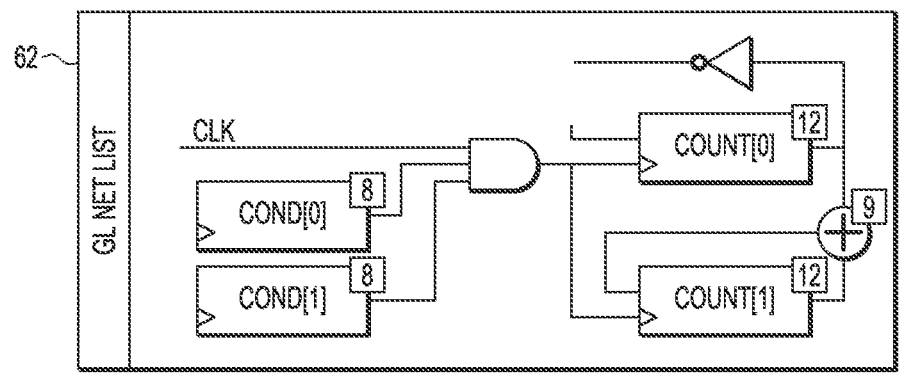
Figure 10A:
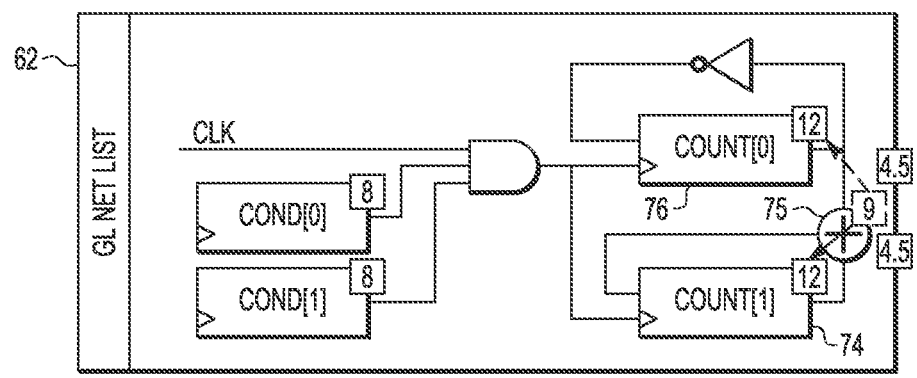
Figure 10B:
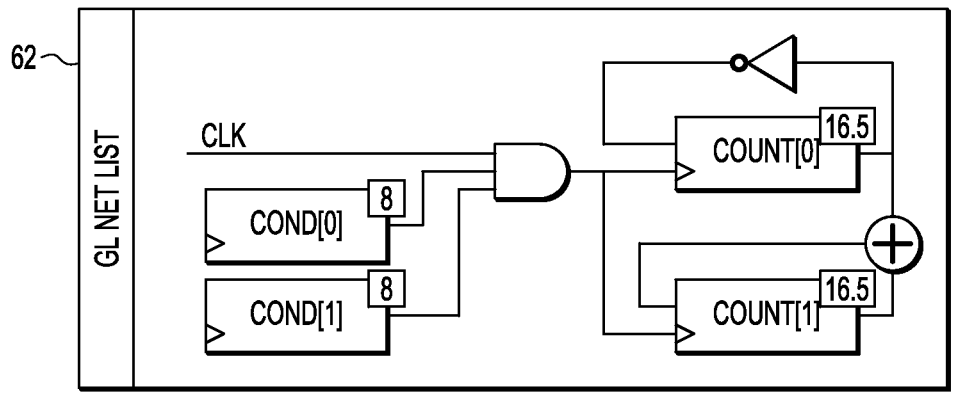

The same mapping is repeated for each of the instance different from standards cells, namely for the inverter 77 as shown in FIG. 9A and FIG. 9B and for the adder 75 as shown in FIG. 10A and FIG. 10B. More precisely, as shown in FIG. 9A, the metrics value of 2 milliwatts of the inverter 77 is divided in two portions of 1 milliwatt each, which are added to the metrics values of flip-flops 74 and 76, respectively, whereby to obtain the configuration illustrated in FIG. 9B. Similarly, as shown in FIG. 10A, the metrics value of 9 milliwatts of the adder 75 is divided in two portions of 4.5 milliwatts each, which are added to the metrics values of flip-flops 74 and 76, respectively, whereby to obtain the configuration illustrated in FIG. 10B.

Figure 11:
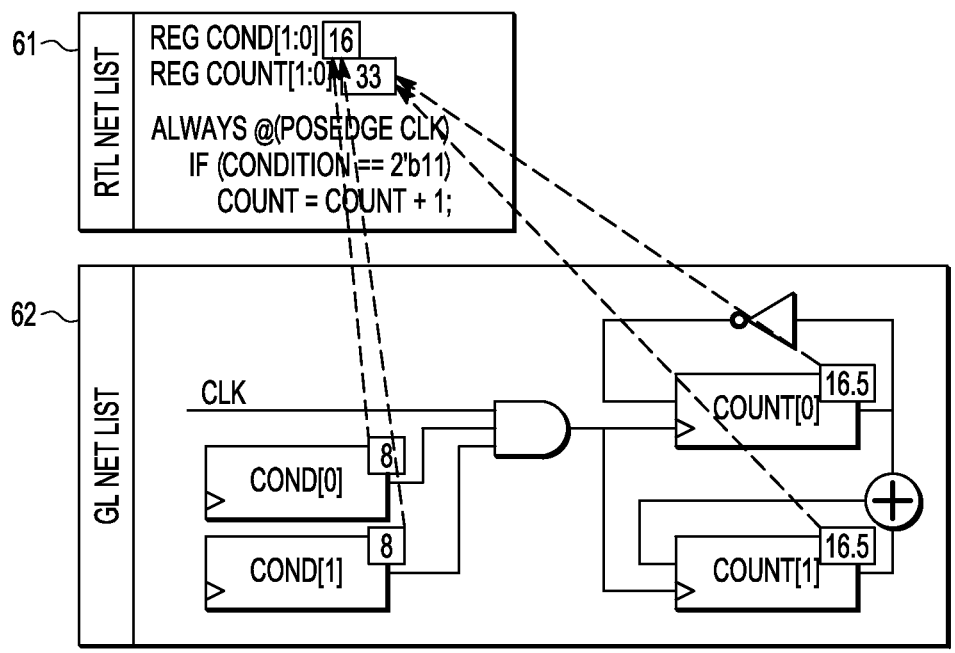

Then, the final metrics values of the instances of the GL net list 62 as shown in FIG. 10B are mapped to the corresponding sub-modules of the high level description of the IC, namely to the registers "cond[1:0]" and "count[1:0]" of the RTL net list 61. This second mapping is illustrated by FIG. 11.

It shall be noted that the invention is not intended to be limited to power consumption metrics. For instance, Design for Testability (DFT) metrics can be used to ensure design optimization with respect of testability of the design. DFT is a name for design techniques that add certain testability features to the hardware design of a semiconductor integrated circuit. Another example of metrics indicative of the die area used by the design, which it is desirable to keep as low as possible for reducing the cost of semiconductor integrated circuits.

Also, a mix of metrics of different types may be used to provide a multi-criteria optimization scheme.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non volatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the functional description of the processor 20 given in FIG. 3 may be implemented in various ways, by grouping and/or spreading out at least some of the functions described therein.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A method for optimizing performance of a semiconductor integrated circuit, the method comprising:
generating from a behavioral description of the semiconductor integrated circuit, a high level description of said semiconductor integrated circuit, in which the semiconductor integrated circuit is partitioned into sub-modules, each sub-module including at least one register;
generating, from the high level description of the semiconductor integrated circuit, a low level description of the semiconductor integrated circuit comprising a plurality of instances describing operation of the semiconductor integrated circuit, in which the plurality of instances respectively describe logically interconnected functional units including standard cells and other functional units different from said standard cells;
retrieving, from a technology library, metrics values respectively associated with each instance of the low level description of the semiconductor integrated circuit;
conducting a low level function analysis of the semiconductor integrated circuit based on said metrics values;
performing a design optimization comprising first mapping the metrics values of instances describing, in the low level description of the semiconductor integrated circuit, functional units different from the standard cells, to standard cells logically connected to said instances, by dividing each of said instance metrics values between standard cells logically connected to the corresponding instance and adding each resulting portion of said instance metrics value to the metrics value of each of said standard cells logically connected to said corresponding instance, second mapping the metrics values respectively associated with each standard cell of the low level description of the semiconductor integrated circuit to a corresponding register of the high level description of the integrated circuit, based on the first mapping, and determining metrics values respectively associated with the sub-modules based on the second mapping;
generating an optimized layout of the semiconductor integrated circuit based upon the determined metrics values; and
fabricating the semiconductor integrated circuit based upon the optimized layout.

2. The method of claim 1, wherein the first mapping is performed by dividing the metrics value of the instance equally between all the flip-flops logically connected to said instance.

3. The method of claim 1, wherein, in the high level description of the semiconductor integrated circuit, said integrated circuit is partitioned into sub-modules at least some of which including a plurality of registers logically associated according to a hierarchy, and wherein for every sub-module of the low level description of the integrated circuit, the determining of the metrics value of the sub-module comprises setting said metrics value as the sum of respective metrics values of all registers of the sub-module in the hierarchy.

4. The method of claim 1, wherein in the high level description of the semiconductor integrated circuit, said integrated circuit is partitioned into sub-modules at least some of which including a plurality of registers logically associated according to a hierarchy with at least one sub-hierarchy, for every sub-module of the low level description of the integrated circuit, the determining of the metrics value of the sub-module comprises setting said metrics value as the sum of respective metrics values of all registers of the sub-module in the hierarchy and in every sub-hierarchy of said hierarchy.

5. The method of claim 1, wherein the high level description of the semiconductor integrated circuit comprises a Register Transfer Level (RTL) description in which the semiconductor integrated circuit is partitioned into sub-modules, each sub-module including RTL registers.

6. The method of claim 1, wherein the low level description of the semiconductor integrated circuit comprises a Gate Level (GL) net list having instances describing the operation of the semiconductor integrated circuit.

7. The method of claim 1, wherein the metrics values include power consumption values respectively associated with each instance of the low level description of the semiconductor integrated circuit.

8. The method of claim 7, wherein the first mapping comprises dividing the instance metrics values of each of the instances between standard cells logically connected to the corresponding instance substantially equally between at least one drive standard cell and at least one load standard cell to which said corresponding instance is logically connected.

9. The method of claim 1, wherein the standard cells are flip-flops.

10. A computer program product embodied on a non-transitory computer readable medium comprising computer readable code which, when implemented on a design processor causes the design processor to perform the method according to claim 1.

11. A design processor configured to optimize performance of a semiconductor integrated circuit comprising:
a high level synthesizer configured to generate, from a behavioral description of the semiconductor integrated circuit, a high level description of said semiconductor integrated circuit, in which the semiconductor integrated circuit is partitioned into sub-modules, each sub-module including at least one register;
a low level synthesizer configured to generate, from the high level description of the semiconductor integrated circuit, a low level description of the semiconductor integrated circuit comprising a plurality of instances describing operation of the semiconductor integrated circuit, in which the plurality of instances respectively describe logically interconnected functional units including standard cells and other cells different from said standard cells;

a low level function simulation unit configured to retrieve, from a technology library, metrics values respectively associated with each instance of the low level description of the semiconductor integrated circuit, and to conduct a low level function analysis of the semiconductor integrated circuit based on said metrics values;

a design optimization unit configured to perform a first mapping of the metrics values of instances describing, in the low level description of the semiconductor integrated circuit, functional units different from the standard cells, to standard cells logically connected to said instances, by dividing each of said instance metrics values between standard cells logically connected to the corresponding instance and adding each resulting portion of said instance metrics value to the metrics value of each of said standard cells logically connected to said corresponding instance, a second mapping of the metrics values respectively associated with each standard cell of the low level description of the semiconductor integrated circuit to a corresponding register of the high level description of the integrated circuit, based on the first mapping, and a determination of the metrics values respectively associated to the sub-modules, based on the second mapping; and a layout unit configured to generate an optimized layout of the semiconductor integrated circuit based upon the determined metrics values; and a tape output unit configured to fabricate the semiconductor integrated circuit based upon the optimized layout.

12. The design processor of claim 11, wherein the first mapping is done by dividing the metrics value of the instance equally between all the flip-flops logically connected to said instance.

13. The design processor of claim 11, wherein, in the high level description of the semiconductor integrated circuit, said integrated circuit is partitioned into sub-modules at least some of which including a plurality of registers logically associated according to a hierarchy, and wherein for every sub-module of the low level description of the semiconductor integrated circuit, the determination of the metrics value of the sub-module comprises the setting of said metrics value as the sum of respective metrics values of all registers of the sub-module in the hierarchy.

14. The design processor of claim 11, wherein in the high level description of the semiconductor integrated circuit, said semiconductor integrated circuit is partitioned into sub-modules at least some of which including a plurality of registers logically associated according to a hierarchy with at least one sub-hierarchy, for every sub-module of the low level description of the integrated circuit, the determination of the metrics value of the sub-module comprises the setting of said metrics value as the sum of respective metrics values of all registers of the sub-module in the hierarchy and in every sub-hierarchy of said hierarchy.

15. The design processor of claim 11, wherein the high level description of the semiconductor integrated circuit comprises a Register Transfer Level (RTL) description in which the semiconductor integrated circuit is partitioned into sub-modules, each sub-module including RTL registers.

16. The design processor of claim 11, wherein the low level description of the integrated circuit comprises a Gate Level (GL) net list having instances describing the operation of the semiconductor integrated circuit.

17. The design processor of claim 11, wherein the metrics values include power consumption values respectively associated with each instance of the low level description of the semiconductor integrated circuit.

18. The design processor of claim 17, wherein the first mapping comprises dividing the instance metrics values of each of the instances between standard cells logically connected to the corresponding instance substantially equally between at least one drive standard cell and at least one load standard cell to which said corresponding instance is logically connected.

19. The design processor of claim 11, wherein the standard cells are flip-flops.

* * * * *